United States Patent [19]

Louboutin et al.

[11] Patent Number: 4,604,197
[45] Date of Patent: Aug. 5, 1986

[54] SUBMERGED FILTER FILLED WITH GRANULAR MATERIAL

[75] Inventors: Robert Louboutin, Crespières; Jean Gibaud, Paris, both of France

[73] Assignee: Degremont, Hauts de Seine, France

[21] Appl. No.: 687,427

[22] Filed: Dec. 28, 1984

[30] Foreign Application Priority Data

Jan. 2, 1984 [FR] France ............................. 84 00008

[51] Int. Cl.⁴ .......................... C02F 3/06; B01D 23/20
[52] U.S. Cl. .................................. 210/150; 210/274; 210/275; 210/292; 210/293
[58] Field of Search ............... 210/274, 275, 291–293, 210/289, 617, 618, 150

[56] References Cited

U.S. PATENT DOCUMENTS

| 2,559,936 | 7/1951 | Buffle | 210/274 |
| 4,191,652 | 3/1980 | Whitmore | 210/274 |
| 4,476,020 | 10/1984 | Cheetham | 210/293 |

FOREIGN PATENT DOCUMENTS

| 0019656 | 6/1979 | European Pat. Off. . | |
| 0072264 | 6/1982 | European Pat. Off. . | |
| 917363 | 9/1954 | Fed. Rep. of Germany | 210/274 |
| 2179046 | 11/1973 | France . | |
| 2528324 | 3/1982 | France . | |
| 95800 | 5/1939 | Sweden | 210/292 |
| 494934 | 11/1938 | United Kingdom | 210/292 |
| 988584 | 4/1965 | United Kingdom . | |

Primary Examiner—Benoit Castel
Attorney, Agent, or Firm—Wenderoth, Lind & Ponack

[57] ABSTRACT

A submerged filter includes filtering matter in the form of a granular material contained in a vat having a floor for supporting the granular material. The liquid to be treated flows from the bottom to top and is brought into contact with a gas serving for the treatment of the liquid and circulating in the same direction. The filtering material is washed with water and air. The liquid to be treated, the treating gas, and the wash fluids are introduced into the filtering mass through the floor by means of nozzles which extend through the floor. Some of the nozzles essentially serve for introducing the treating gas, while others serve for introducing the liquid to be treated and the fluids for washing the filtering material.

3 Claims, 2 Drawing Figures

SUBMERGED FILTER FILLED WITH GRANULAR MATERIAL

BACKGROUND OF THE INVENTION

The present invention relates to submerged filters to be filled with during a normal filtering operation granular material in which a liquid to be treated and flowing from bottom to top is brought into contact with a gas likewise flowing from bottom to top.

These filters are used in particular for the biological purification of sewage by "fixed cultures" and, more generally, any time when a gas and a liquid flow in an ascending co-current manner through a completely immersed granular material.

The conventional process for the biological purification of sewage by fixed cultures consists in causing this sewage to seep through a granular mass colonized by purifying micro-organisms capable of decomposing by microbial action the organic matter the sewage carries. This biodegradation can only be accomplished if these microorganisms receive a supply of oxygen that is sufficient for their energy needs, their reproduction and their endogenous respiration. The oxygen source usually consists of atmospheric air, but pure oxygen or air enriched with oxygen can likewise be employed.

Because of the supply by the sewage to be treated of materials in suspension, and in particular because of the generation of bacterial mass inherent to the process, there occurs over time a filling of the intergranular space and thereby a clogging of the filtering environment which then will have to be cleaned. Hence, the pieces of apparatus for carrying out the purification process must include an underdrainage system or supporting floor for the granular material and which is equipped with nozzles of a type known from the prior art to ensure an efficient washing by water and air of this granular material.

The main difficulty that arises when carrying out the process in an apparatus operating with an ascending current lies in the necessity of distributing homogeneously throughout all of the granular contact mass the water within which there is generated, under aerobic conditions, a considerable amount of bacteria and the air necessary for carrying out the process, whereby the water and air flow rates are likely to fluctuate over time. This distribution of the two fluids is indispensable for the proper implementation of the process, since an inadequate distribution of the water to be treated will result in an improper utilization of all of the space of the apparatus and, consequently, in a degradation of the purification results, and an inadequate distribution of the air will lead to the creation of anaerobic zones to the point where the efficiency of the apparatus is lowered.

To ensure this distribution, at least two approaches have been proposed in the past.

A first approach consists in disposing above the underdrainage system or floor of the granular environment a branched, perforated header for distributing the treating air. This approach has at least two disadvantages:

when the flow of treating water is low or when the plant is at a standstill, this header is partially or totally filled with raw material, which leads to a relatively long duration clogging of the distribution openings owing to the bacterial generation therein.

the presence of a network of pipes above floor or underdrainage system for supporting the granular material interferes with the flow of the fluids during washing, thereby lowering the efficiency of the apparatus.

the construction of an apparatus thus designed is complicated and entails great costs.

Theoretically, a second approach enables one to make up for the first drawback of the first approach. It consists in distributing the water to be treated above the floor through a branched header and to introduce the treating air below the floor by means of nozzles. Since the flow rate of the treating air can be ten times lower than that of the wash air, its distribution can only be accomplished by a fraction of the total number of nozzles each of which includes, in the upper part of its tube that emerges some fifteen centimeters below the floor, a sized hole that creates, during the passage of air, a loss of charge such as to form below the floor an air cushion with a uniform thickness and which feeds the nozzles for distributing the treating air. Since the water that fills the space defined between the floor and the bottom of the apparatus is clear water, there is, in theory, below the floor between the raw water and the air, no contact that is likely to lead to bacterial generation and that can lead to the clogging of the air distribution holes.

In essence, it has been found that, on account of the emergence of an "air lift" phenomenon, there arose, concurrently with a lifting of clear water through nozzles for distributing treating air, a lowering in said space of an equal flow rate of raw water distributed above the floor by the branched header, so that the clear water was quickly replaced by raw water, with the result that a biomass was generated in the tubes of the nozzles for the distribution of treating air. This leads to the gradual clogging and plugging of the openings for passage of the air.

SUMMARY OF THE INVENTION

The concept of the filter embodying the invention enables one to overcome all of the drawbacks of the approaches that have been proposed in the past.

The submerged filter of the invention includes a filtering mass of a granular material contained in a vat having a floor for supporting the granular material. The liquid to be filtered flows from the bottom to top and is brought into contact with a gas serving to treat the liquid and circulating in the same direction. The filtering material is washed with water and air also flowing upwardly. The liquid to be treated, the treating gas and the wash fluids are introduced into the filtering mass and through the floor by means of nozzles extending through the floor. Some of the nozzles are used to introduce the treating gas and others to introduce the liquid to be treated and the fluids for washing the filtering material.

According to one feature of the invention, the nozzles serving to introduce the treating gas are so arranged as to create a loss of pressure that causes the formation, below the floor, of a gas cushion so that, during the normal operation of the filter, the openings of the nozzles serving to introduce the liquid to be filtered and the fluids for washing the filter are then immersed in an environment composed solely of the liquid to be treated and that, during the washing of the filter, these same openings are dewatered in order to enable the wash fluids to be introduced into the filter. This introduction is likewise assured by the other nozzles.

The various features and advantages of the invention will become apparent from the ensuing description of one embodiment of an apparatus for treating water fixed cultures.

BRIEF DESCRIPTION OF THE DRAWINGS

During this description, reference is made to the accompanying drawings, in which.

DETAILED DESCRIPTION OF THE INVENTION

Figure 1:
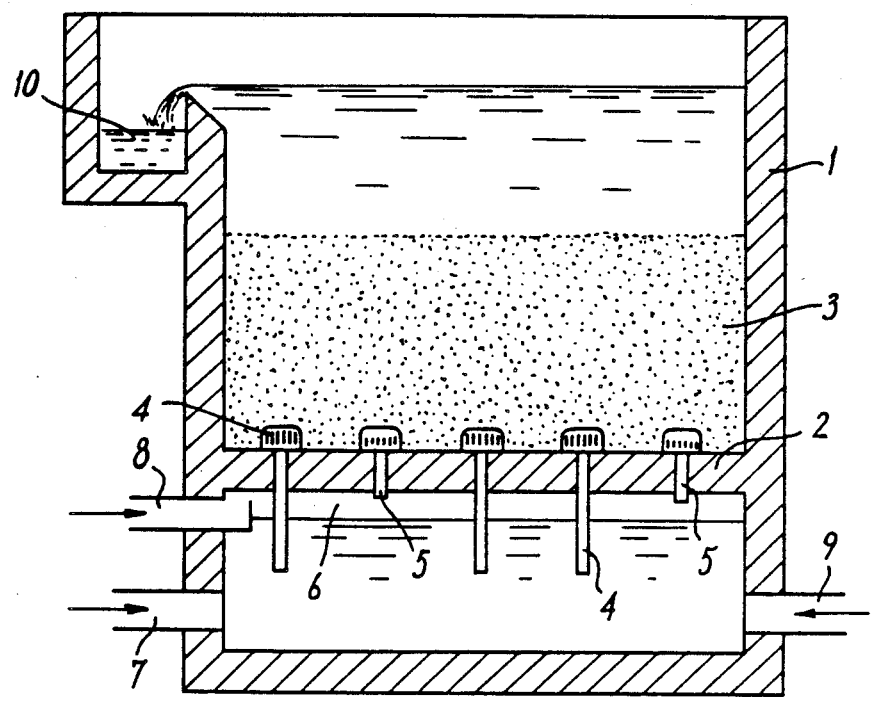
FIG. 1 is a cross-sectional view of the apparatus of the invention.

As will be seen in FIG. 1, the apparatus taught by the invention consists of a container or vat 1 having at a lower part thereof a floor or support member 2 defining therebelow a chamber 6 and supporting a granular mass 3. This floor is equipped with two types of nozzles. Nozzles 4 of a first type serve to introduce into the filtering matter or mass 3 water to be treated and wash fluids. Nozzles 5 of a second type are intended to introduce into the same filtering mass the treating water air. According to the invention, there are more nozzles 4 of the first type, e.g., five to ten times more, than nozzles 5 of the second type.

There runs into a chamber 6 located below the floor 2 a branch or passage 7 for introducing water to be treated, a branch or passage 8 for introducing treating air, and a branch or passage 9 for introducing washing water. A trough 10 disposed at the upper part of the vat is designed to collect the treated water and the water for washing the filtering granular material.

Figure 2:
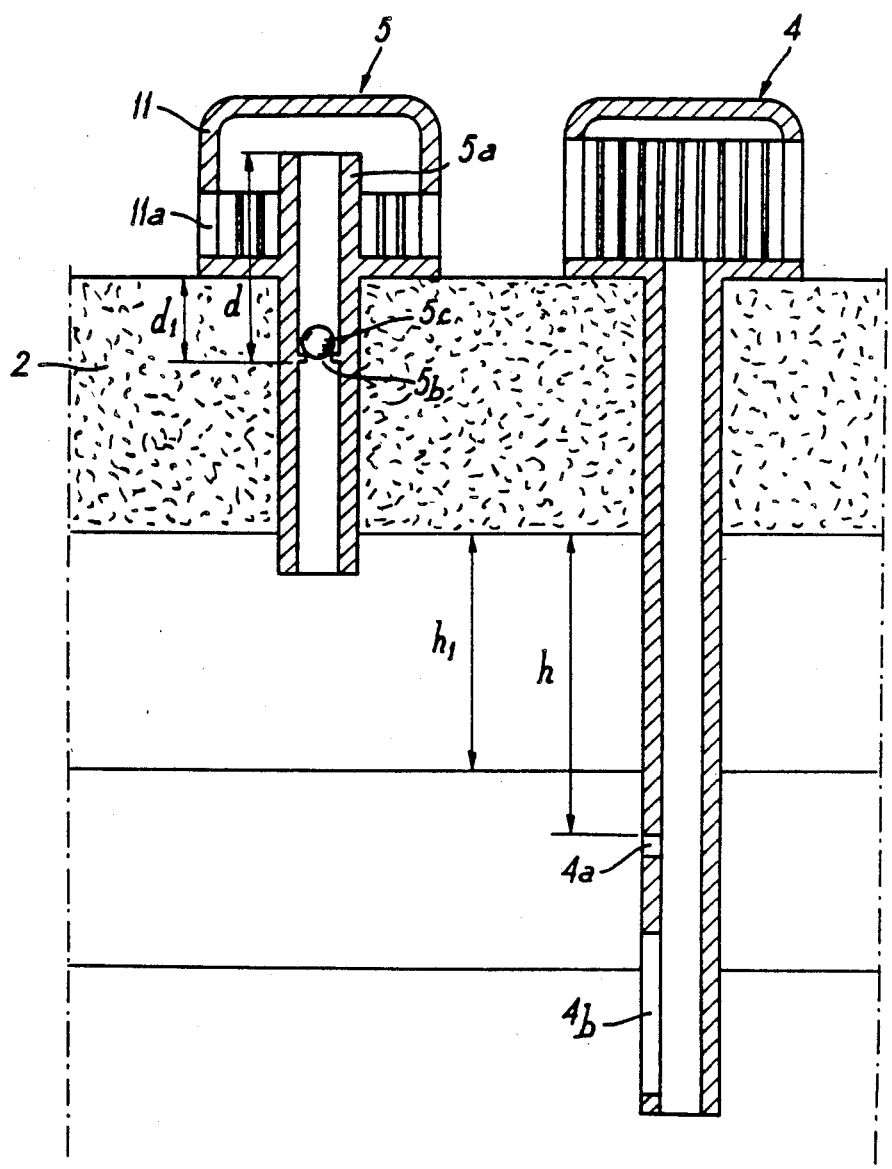
FIG. 2 is a cross-sectional view, on a larger scale, of a part of an underdrainage system thereof equipped with nozzles.

In FIG. 2, which is a cross-sectional view of a part of the floor 2 depicted in FIG. 1, there is shown, likewise in cross section, a nozzle 5 for distributing treating air and a nozzle 4 for distributing treating water and wash water and wash air.

In accordance with the invention, each nozzle of the second type includes a tube 5a passing through the floor 2 and within which there is provided a constriction 5b serving as a seat for a valve 5c, preferably in the form of a metal ball and which may be lined with a plastic or rubber material. The upper end of tube 5a emerges above the floor at a distance d from the seat 5b greater than a distance $d_1$ separating seat 5b from the upper surface of the floor. The upper end of tube 5a is surrounded by a bell jar or cup-shaped member 11 having extending through a lower portion thereof a number of openings, advantageously provided in the form of slots 11a and whose dimensions are such that the granular material cannot enter the nozzle.

By advantageously choosing the diameters of the tube 5a, of the opening 5b, of the ball 5c and the mass of the latter, the loss of pressure through a nozzle 5 within the limits of variation of the treating air flow rate varies very little, because it corresponds essentially to the pressure required for lifting the ball off its seat. On the other hand, beyond the maximum value of the treating air flow rate, the restrictions imposed by the constriction 5b and by the passage between the ball 5a and the tube 5c create a loss of pressure proportional to the square of the flow rate. The total loss of pressure of the nozzle then becomes substantially larger.

Each nozzle 4 of the first type is conventional with a shape known from the prior art and having a wash air inlet 4a spaced a distance h from the lower surface of the floor. Each nozzle 4 has at a lower portion thereof a slot 4b through which passes water for washing the filter.

During the normal operating phase of the apparatus, the treating air is introduced through passage 8 below the floor where it forms a cushion with a thickness $h_1$ still, less than the distance h separating from the floor 2 the opening 4a for distributing wash air through the nozzles 4. This treating air passes through the floor by passing through the nozzles 5, while the raw water that is also introduced below the floor passes through the nozzles 4 which distribute it in the granular mass. Thus, during normal operation, the openings 4a and the slots 4b of nozzles 4 are immersed in water that is practically free from oxygen and in which, as a result, no bateria likely to cause clogging can develop.

Once the granular mass is clogged, it must be washed, the first phase of the washing consisting in introducing air and clear or clean water simultaneously below the floor. During this phase, taking into account the importance of the air flow rate in relation to the treatment rate, the loss of pressure created by the nozzles 5 takes on such a value that the opening 4a and a part of the slot 4b of the nozzles 4 are dewatered, thereby allowing the passage through these nozzles of the wash air which thus mixes with the wash water entering nozzles 4 through their lower slots 4b. During the washing phase with water alone, which follows such first operation, the water introduced below the floor passes through all of the nozzles, including the nozzles 5 for distributing treating air, but then clear water is involved that does not contain matter likely to clog the nozzles.

The invention thus enables one to place the nozzles of both types, be it during the normal operation of the filter or during the washing of the latter, in conditions which practically avoid their being clogged, thereby imparting to the filter a maximum efficiency.

It will be understood that the invention is not limited to the embodiment shown and described herein nor to its application, which are solely given by way of non-limiting example.

We claim:

1. A submerged filter comprising:
   a container having a bottom and a floor positioned above said bottom, said bottom and floor defining a chamber;
   a filter mass comprising granular material supported by said floor within said container, liquid to be treated and treating gas passing upwardly through said filter mass during normal operation of said filter, and washing water and gas passing upwardly through said filter mass during a washing operation thereof;
   means for introducing liquid to be treated into said chamber during said normal operation;
   means for introducing washing water into said chamber during said washing operation;
   means for introducing into said chamber gas at a first flow rate as said treating gas during said normal operation and at a second flow rate greater than said first flow rate as said washing gas during said washing operation;
   a plurality of first nozzles extending through said floor and leading from said chamber to said granular material, each said first nozzle including first opening means for, during said normal operation, passing said liquid to be treated from said chamber into said granular material and for, during said washing operation, passing said washing gas from said chamber into said granular material, and each said first nozzle further including second opening means for, during said normal operation, passing said liquid to be treated from said chamber into said granular material and for, during said washing operation, passing said washing water from said chamber into said granular material;

a plurality of second nozzles extending through said floor and leading from chamber to said granular material for, during said normal operation, passing said treating gas from said chamber into said granular material, each said second nozzle comprising a tube extending through and above said floor and having a passage, a cup-shaped member above said floor and covering an upper end of said tube, and openings extending through said cup-shaped member; and said second nozzles having means for, during said normal operation with said treating gas introduced into said chamber at said first flow rate, creating a gas cushion within said chamber below said floor sufficient to prevent said liquid to be treated from entering said second nozzles and to ensure that said first and second opening means of said first nozzles are maintained submerged in said liquid to be treated, and for, during said washing operation with said washing gas introduced into said chamber at said second flow rate, creating an increased size gas cushion within said chamber below said floor sufficient to prevent submerging of said first opening means of said first nozzles in said washing water, said cushion creating means comprising, for each said second nozzle, a restriction within said passage of said tube, said restriction defining a valve, and a valve member positioned above said seat and movable away therefrom by said gas passing upwardly through said tube.

2. A filter as claimed in claim 1, wherein said valve member comprises a ball.

3. A filter as claimed in claim 1, wherein said openings in said cup-shaped member comprise vertical slots.

* * * * *